United States Patent [19]

Chan, Jr.

[11] 4,421,775

[45] Dec. 20, 1983

[54] METHOD FOR REMOVING THE OUTER WAXY CUTIN-CONTAINING LAYER FROM PAPAYA

[75] Inventor: Harvey T. Chan, Jr., Hilo, Hi.

[73] Assignee: The United States of America as represented by the Secretary of Agriculture, Washington, D.C.

[21] Appl. No.: 385,172

[22] Filed: Jun. 4, 1982

[51] Int. Cl.$^3$ .................... A23L 1/212; A23P 1/00
[52] U.S. Cl. ............................. 426/482; 426/384; 426/483; 426/524
[58] Field of Search ............... 426/384, 478, 481, 483, 426/524, 482

[56] References Cited

U.S. PATENT DOCUMENTS 3,857,983  12/1974  Roth .................................. 426/481

OTHER PUBLICATIONS

M. B. Dickman et al., "Purification, Characterization and Role in Infection of an Extracellular Cutinolytic Enzyme from *Colletotrichum gloeosporioides* Penz. on *Carica papaya* L.", *Physiological Plant Pathology, in press.*
T. J. Walton and P. E. Kolattukudy, "Determination of the Structures of Cutin Monomers by a Novel Depolymerization Procedure and Combined Gas Chromatography and Mass Spectrometry", *Biochemistry*, vol. 11, No. 10, pp. 1885–1886 (1972).

*Primary Examiner*—Robert A. Yoncoskie
*Assistant Examiner*—George C. Yeung
*Attorney, Agent, or Firm*—M. Howard Silverstein; David G. McConnell; Margaret A. Connor

[57] ABSTRACT

The outer waxy, cutin-containing layer is removed from papaya by freeze-drying the fruit to separate the layer from the underlying fruit and then mechanically removing the so-separated layer.

2 Claims, No Drawings

METHOD FOR REMOVING THE OUTER WAXY CUTIN-CONTAINING LAYER FROM PAPAYA

BACKGROUND OF THE INVENTION

1. Field of the Invention

The invention relates to and has among its objects the provision of a novel method for removing the outer waxy layer from papaya.

2. Description of the Prior Art

Papaya (Carica papaya) is a tropical plant, the fruit of which has an outer waxy layer, a thin skin (epidermal) layer beneath the waxy layer, a thick fleshy edible inner portion and a central seed-containing cavity. The outer waxy layer is composed of cutin, suberin and waxes and is a valuable source of these materials and particularly is a good natural source of cutin. Cutin is an insoluble, water-impermeable complex aggregate of waxes, fatty acids, higher alcohols and resinous material. It is the structural component of plant cuticle and is important in the prevention of the entry of pathogens into plants. In plant research, cutin is valuable as a substrate in the study of cutinase, an extracellular enzyme produced by plant pathogenic fungi which digests cutin thus allowing the fungi to attack and destroy the fruit. Currently, no commercial source of cutin exists because of the intensity of labor to isolate it.

Papayas are a good source of cutin. At present, the outer waxy, cutin-containing layer is removed from the flesh by immersing or rinsing the fruit in organic solvents such as chloroform-methanol and chloroform-ethanol at elevated temperatures or by freezing the fruit followed by immersion in hot (60° C.) water and mechanical scraping of the outer surface of the fruit. The former method has the disadvantage of using hot solvents while the latter is labor intensive.

SUMMARY OF THE INVENTION

The invention provides a simple method of removing the cutin-containing outer waxy layer from papayas. In the method of the invention, papayas, whole or cut into parts, are freeze-dried by conventional methods. Unexpectedly, this procedure causes the outer waxy, cutin-containing layer to separate from the underlying epidermal and fleshy layers so that it can be readily removed by brushing, rubbing, or the like. Such a phenomenon was not anticipated and does not occur during the freeze drying of other fruits such as bananas, apples, and the like, or of waxy vegetables such as cucumbers, zucchini, bell peppers and green beans.

The primary advantage of the invention is the ready removal of the cutin-containing layer, free of underlying fruit material, thereby providing a source of crude cutin.

Another advantage of the method is that the use of hot solvents to remove the outer-waxy layer is avoided, thus eliminating the use of organic solvents and the deleterious effect of heat on cutin.

DETAILED DESCRIPTION OF THE INVENTION

Frozen papayas, either whole or in parts, are subjected to conventional freeze-drying for a time sufficient to cause the outer waxy layer to form a film around the fruit and to cause the underlying fruit to shrink so that the outer layer becomes separated from the underlying fruit. Next, the outer layer is mechanically removed from the dehydrated fruit by brushing, scraping or the like.

Freeze-drying is carried out under conventional conditions well-known to those skilled in the art. The time of freeze-drying to separate the outer layer varies with the amount of papayas processed, usually from about 48 to 72 fours. Isolation of cutin from the outer waxy layer is carried out by boiling the crude cutin preparation in an oxalic acid buffer comprising an aqueous solution of oxalic acid (4 g/l) and ammonium oxalate 16 g/l), filtering through a nylon cloth, extracting with chloroform in a soxlet apparatus, drying the extract and digesting it with a solution of Aspergillus niger cellulase (5 g/l) and fungal pectinase (1 g/l) in pH 4.0 acetate buffer (0.05 M) at 30° for 14 hours as described by Walton and Kolattukudy, Biochemistry, Vol. 11, No. 10, p. 1886 (1972), which is hereby incorporated by reference.

EXAMPLE 1

440 kg of papayas (a mixture of whole and halves) were frozen at $-20°$ C. The frozen papayas were then placed in the vacuum chamber of a Labconco Model #18 freeze-drier and freeze-dried under a vacuum of 50 microns of mercury with a condenser temperature of $-50°$ C. After freeze-drying for 60 hours, the dehydrated papayas were removed. The outer waxy layer formed a white, sheet-like outer layer which was separated from the underlying slightly shrunken green fruit. The so-separated layer was removed in flakes by dry brushing. 210 gm of cutin-containing material was obtained.

EXAMPLE 2

This example is not in accordance with the invention but is provided for purposes of comparison.

500 g of green beans were freeze-dried as described in Example 1. A white outer coating formed on the outside of the vegetable but was only slighty separated from the underlying layers in a few places and could not be removed by brushing or rubbing.

Having thus described my invention, I claim:

1. A method for removing the outer waxy, cutin-containing layer from papaya, comprising:
   (a) freezing the papaya at a predetermined temperature to form a frozen papaya;
   (b) freeze-drying the frozen papaya for a time sufficient to cause the outer waxy, cutin-containing layer to form a film around the papaya and to cause the underlying papaya to shrink so that the outer layer becomes separated from the underlying papaya; and
   (c) mechanically removing the so-separated layer.
2. The method of claim 1, further comprising:
   (d) isolating the cutin from the so-removed outer waxy, cutin-containing layer.

* * * * *